United States Patent
Poell et al.

(10) Patent No.: US 10,377,088 B2
(45) Date of Patent: *Aug. 13, 2019

(54) DEVICE AND METHOD FOR LIQUID-TIGHT SEALING OF TWO PARTIALLY OVERLAPPING PACKAGING PARTS AND CONTAINERS PRODUCED THEREWITH/THEREBY

(71) Applicant: SIG Technology AG, Neuhausen am Rheinfall (CH)

(72) Inventors: Holger Poell, Stuttgart (DE); Marco Pluess, Feuerthalen (CH); Martin Ruegg, Uhwiesen (CH)

(73) Assignee: SIG Technology AG, Neuhausen am Rheinfall (NL)

( * ) Notice: Subject to any disclaimer, the term of this patent is extended or adjusted under 35 U.S.C. 154(b) by 592 days.

This patent is subject to a terminal disclaimer.

(21) Appl. No.: 14/903,764

(22) PCT Filed: Jun. 5, 2014

(86) PCT No.: PCT/EP2014/061653
§ 371 (c)(1),
(2) Date: Jan. 8, 2016

(87) PCT Pub. No.: WO2015/003859
PCT Pub. Date: Jan. 15, 2015

(65) Prior Publication Data
US 2016/0159004 A1   Jun. 9, 2016

(30) Foreign Application Priority Data

Jul. 12, 2013  (DE) .................. 10 2013 107 429

(51) Int. Cl.
*B29C 65/00* (2006.01)
*B65D 8/00* (2006.01)
(Continued)

(52) U.S. Cl.
CPC ............ *B29C 66/542* (2013.01); *B29C 65/08* (2013.01); *B29C 65/10* (2013.01);
(Continued)

(58) Field of Classification Search
CPC .............. B29C 66/542; B29C 66/8227; B29C 66/8244; B29C 66/63; B29C 65/10;
(Continued)

(56) References Cited

U.S. PATENT DOCUMENTS

| 1,867,288 A | 7/1932 | Thomas | |
| 3,242,630 A * | 3/1966 | Danielzig | ............... B65B 43/34 |
| | | | 383/37 |

(Continued)

FOREIGN PATENT DOCUMENTS

| CN | 1343172 A | 4/2002 |
| CN | 102883961 A | 1/2013 |

(Continued)

*Primary Examiner* — Alexander M Valvis
*Assistant Examiner* — Katie L Gerth
(74) *Attorney, Agent, or Firm* — The Webb Law Firm

(57) ABSTRACT

A device for liquid-tight sealing of two partially overlapping packaging components. One of these is a tubular basic body. A further packaging component forms the packaging head or bottom, having at least one mandrel and one die. For the tubular basic body to be easily slid on to the mandrel and removed the expansion elements have sealing jaws which, in their working position, form a closed, encircling outer contour.

15 Claims, 4 Drawing Sheets

(51) Int. Cl.
  *B31B 110/35* (2017.01)
  *B29C 65/08* (2006.01)
  *B29C 65/10* (2006.01)
  *B65B 3/02* (2006.01)
  *B65D 5/42* (2006.01)
  *B29L 31/00* (2006.01)
  *B31B 105/00* (2017.01)

(52) U.S. Cl.
  CPC .... *B29C 66/1122* (2013.01); *B29C 66/24245* (2013.01); *B29C 66/5344* (2013.01); *B29C 66/612* (2013.01); *B29C 66/63* (2013.01); *B29C 66/81463* (2013.01); *B29C 66/8227* (2013.01); *B29C 66/8244* (2013.01); *B29C 66/8324* (2013.01); *B65B 3/027* (2013.01); *B65D 5/4279* (2013.01); *B65D 11/04* (2013.01); *B29C 66/7234* (2013.01); *B29C 66/72321* (2013.01); *B29C 66/72328* (2013.01); *B29C 66/8161* (2013.01); *B29C 66/82261* (2013.01); *B29C 66/851* (2013.01); *B29L 2031/712* (2013.01); *B31B 2105/00* (2017.08); *B31B 2105/0022* (2017.08); *B31B 2110/35* (2017.08)

(58) Field of Classification Search
  CPC ..... B29C 65/08; B29C 66/534; B65B 5/4279; B65B 7/2878; B31B 50/814
  USPC ............. 493/84, 102; 156/69; 53/478, 329.2
  See application file for complete search history.

(56) References Cited

U.S. PATENT DOCUMENTS

| | | | | |
|---|---|---|---|---|
| 3,343,465 | A | | 9/1967 | Albert |
| 3,438,824 | A | * | 4/1969 | Balamuth ............... B29C 66/63 156/69 |
| 3,475,250 | A | | 10/1969 | Scalora |
| 3,513,755 | A | * | 5/1970 | Nestler ................... B31B 70/00 493/194 |
| 3,542,383 | A | * | 11/1970 | Farley ................... B23B 31/207 269/49 |
| 3,637,156 | A | * | 1/1972 | Shepherd ............. B65H 54/543 242/573.3 |
| 4,060,577 | A | * | 11/1977 | Collins ................... B29C 55/24 229/400 |
| 4,330,289 | A | * | 5/1982 | Christensson ......... B31C 1/086 493/100 |
| 4,386,999 | A | * | 6/1983 | Fortuna ............... B29C 65/0672 156/165 |
| 4,790,741 | A | * | 12/1988 | Takakusaki ......... B29C 49/4205 264/905 |
| 5,088,642 | A | | 2/1992 | Farber |
| 5,416,303 | A | * | 5/1995 | Grooms ................. B29C 65/18 219/633 |
| 5,808,384 | A | * | 9/1998 | Tabat ..................... H02K 33/00 310/40 MM |
| 6,764,576 | B1 | | 7/2004 | Heinonen et al. |
| 2008/0105698 | A1 | * | 5/2008 | Paradiso .................. B65D 3/12 220/796 |
| 2013/0193138 | A1 | | 8/2013 | Alther et al. |
| 2013/0305659 | A1 | | 11/2013 | Kenn et al. |

FOREIGN PATENT DOCUMENTS

| | | |
|---|---|---|
| CN | 103201094 A | 7/2013 |
| DE | 1906796 A1 | 8/1970 |
| DE | 3942319 A1 | 6/1991 |
| DE | 4123487 A1 | 1/1993 |
| DE | 4142167 A1 | 6/1993 |
| DE | 102010014993 A1 | 10/2011 |
| DE | 102010050502 A1 | 5/2012 |
| EP | 0247986 A1 | 12/1987 |
| FR | 1467476 A | 1/1967 |
| FR | 1467476 B | 1/1967 |
| JP | 59115749 U1 | 8/1984 |
| JP | 623875 A | 2/1994 |
| JP | 7137753 A | 5/1995 |
| JP | 2008296985 A | 12/2008 |
| JP | 201225471 A | 2/2012 |
| WO | 2006082473 A2 | 8/2006 |
| WO | 2010049589 A1 | 5/2010 |

\* cited by examiner

DEVICE AND METHOD FOR LIQUID-TIGHT SEALING OF TWO PARTIALLY OVERLAPPING PACKAGING PARTS AND CONTAINERS PRODUCED THEREWITH/THEREBY

CROSS-REFERENCE TO RELATED APPLICATIONS

This application is the United States national phase of International Application No. PCT/EP2014/061653 filed Jun. 5, 2014, and claims priority to German Patent Application No. 10 2013 107 429.4 filed Jul. 12, 2013, the disclosures of which are hereby incorporated in their entirety by reference.

BACKGROUND OF THE INVENTION

Field of the Invention

The invention relates in the first instance to a device for the liquid-tight sealing of two partially overlapping packaging components, wherein one of these is a tubular basic body, in particular formed from a blank made of cardboard/plastic composite material, and wherein a further packaging component forms the packaging head or bottom, having at least one mandrel and one die, wherein the mandrel has at least two expansion elements which, from their working position, to reduce the cross section, are moved towards each other into a rest position, in order to allow the tubular basic body to be easily slid on; it also relates to a corresponding method and ultimately a container manufactured with it.

Description of Related Art

Containers made from a cardboard/plastic composite for—in particular liquid—foodstuffs have long been on the market in a wide variety of shapes and sizes. The composite structure may, in addition to the substrate made from cardboard and an inner and outer plastic layer in each case, also contain additional layers, for example an oxygen barrier layer made from aluminium. Concerning their manufacture, a distinction is made above all between containers made from single blanks and those containers manufactured from roll material on so-called 'tube-forming machines'.

In order to manufacture containers from single blanks, a blank which has already been provided with grooves and printed is made by means of the sealing of two opposing edges using a so-called 'longitudinal weld' into a so-called 'packaging sleeve', a tubular basic body, which then, in the filler, is first sealed to form a container open on one side, shaped and subsequently sterilised, filled and ultimately becomes a finished pack through closure of the other side.

Manufacturing of the first sealed side of the tubular basic body takes place in the filling machine on a so-called 'mandrel wheel', on which a number of mandrels are present that are distributed around its perimeter, onto which the unfolded, tubular basic bodies are pushed and shaped and sealed at one end. During the shaping of the end area, the mandrel serves as mechanical resistance to absorb the reaction forces and during sealing, for example using ultrasonic ultrasound, serves as an anvil, wherein an external sonotrode is brought close to the packaging. The mandrels are conveyed, through intermittent rotation of the mandrel wheel, in succession to various processing stations, as shown for example in DE 41 42 167 A1.

With most packs on the market, their ends are prepared through the folding and sealing of the tubular basic body itself. For special pack shapes, one end may also be formed from a prefabricated moulded body as a further packaging component, which in turn may be made individually from plastic or also from fibrous material (pulp). As a result of this, any kinds of geometric designs, in particular with regard to the size and arrangement of moulded openings or spouts, may be produced.

Such a container is known from the German patent application DE 10 2010 014 993 A1. Here, the moulded body forming the upper part of the container is so large that its circumference essentially corresponds to that of the tubular basic body. However, this does not absolutely have to be the case: containers are also known where the cross section of the tubular basic body initially tapers off in order for it then to be connected at its tapered end with an upper part (DE 10 2010 050 502 A1 or DE 39 42 319 A1).

So that, when the tubular basic body is slid onto or removed from the mandrel, damage to it can be safely avoided, "fold-in" mandrels are also known; these can alter the length of their diagonal(s) through mechanical adjustment of appropriately designed corner strips. On this, see for example the German patent application DE 1 063 890 A, which describes a folding mandrel for machines used to produce bags with corners and the like. Here, the adjustment of the corner strips occurs mechanically through the shifting of a sleeve in an axial direction inside the mandrel by means of appropriate, wedge-shaped surfaces for the desired reduction in the cross section of the mandrel. Propulsion is achieved here by means of eccentric cams and rolls. However, contact between the mandrel and the bag only occurs in the corner areas.

The disadvantage of this is that mechanical drive systems—arranged within the mandrels of a mandrel wheel—that are for the purpose of shifting in an axial direction for driving the corner strips involve considerable effort in engineering terms and, in addition, are susceptible to wear and tear and hence require a lot of maintenance.

Proceeding from this, the object of the invention is to develop and improve the device named at the start and a corresponding method and a container manufactured with it in such a way that the tubular basic body can be easily slid onto and removed from the mandrel. Furthermore, a simple but reliable and hardwearing design is needed, by means of which it is also possible to achieve high cycle rates when operating the packaging machines equipped with such a device. In addition, seal marks and damage to the pattern ought to be avoided in a reliable way.

SUMMARY OF THE INVENTION

This task is solved in a device that the expansion elements have sealing jaws which, in their working position, form a closed, encircling outer contour, which corresponds in such a way to an inner contour formed from an opening in the die that, between the inner contour and outer contour, a narrow annular gap remains for the application of a pressing force from inside onto the overlapping area of the packaging components.

According to the invention, the sliding-on and removal of the tubular basic body is made easier, in a reliable way. In addition, seal marks and damage to the pattern can be avoided.

In respect of the method the solution to the task consists of carrying out the following steps:
- conveyance of an unfolded, tubular basic body,
- sliding of the basic body onto a mandrel that has expansion elements,
- supply of a die that has an opening,
- conveyance of a further packaging component onto the mandrel,
- input of joining heat,
- pressing of the basic body and the further packaging component against the die through unfolding of the expansion elements to form an encircling, outer contour in the contact area of the sealing jaws,
- joining of the basic body and further packaging component,
- folding-in of the expansion elements,
- removal of the die and
- removal of the unit composed of basic body and further packaging component.

Finally, the invention relates to a container manufactured using the device according to the invention or the method according to the invention, which is characterised in that— as alternatives—either the basic body, in the overlapping area, surrounds the further packaging component from outside, or the further packaging component, in the overlapping area, surrounds the basic body from outside.

A further teaching of the invention envisages that the expansion elements of a mandrel are arranged on a joint base element in such a way as to be individually swivelling. In this way, two opposing sealing jaws can be moved into the corresponding recesses of the other two opposing sealing jaws in order to reduce the total cross section of the mandrel (rest position).

A further embodiment of the invention envisages that several base elements are attached to a mandrel wheel. Here they are initially arranged so that they are distributed over the perimeter of the mandrel wheel and, furthermore, if the mandrel wheels are of an appropriate width, several parallel rows of circularly arranged mandrels can be provided next to one another. In this way it is possible, with a relatively small overall size, to achieve high throughputs in the manufacture or filling of packs. The base elements may also be formed from the mandrel wheel itself.

According to a further teaching of the invention, it is envisaged that each expansion element is attached to a guide element which allows precise swivelling, and indeed solely in a specified direction. In this way, with for example an approximately square cross section, exact direction vectors can be determined which indicate 45° in the "corners" and therefore also allow firm sealing there. By precisely guiding the direction, wear and tear on the surfaces sliding past each other can also be minimised.

An advantageous development of the invention envisages that the expansion elements are, at least in the area of their sealing jaws, designed as magnet armatures. If then, additionally, the die has one or more magnetic coils around its opening, a particularly elegant and compact propulsion solution can be achieved. Preferably, the axial height of the magnet armatures corresponds to the height of the magnetic coil(s).

Another embodiment of the invention envisages that the die is formed as an integral part in the area of its perimeter of the opening. In this way, the opening in the die can accommodate the mandrel, and no further drives or supporting elements are needed to be able to absorb the reaction forces during the actual sealing.

In accordance with a further teaching of the invention, the die may also have elements for input of the joining heat. In the case of joining by means of ultrasonic welding, these elements may, for joining purposes, comprise at least one ultrasound sonotrode within the die, wherein the sealing jaws serve as an anvil. Alternatively, it is also possible that, as elements for input of the joining heat, hot air openings are provided within the die and/or within the sealing jaws, in the event that the input of the joining heat is to occur by means of the application of hot air.

In a further embodiment of the invention, the conveyance of the further packaging component takes place at the same time as the supply of the die as a result of the fact that the die opening is designed in such as a way as to hold the further packaging element. In this case, the removal of the die and the removal of the unit consisting of the basic body and the further packaging component can then also advantageously occur at the same time, as a result of which the number of necessary processing steps can be significantly reduced.

According to the invention, the unfolding or folding-in of the expansion elements takes place in precisely specified directions. In this way, optimum application of sufficient pressing force can be achieved during the joining process, in particular in the "corner areas".

The joining itself can, in accordance with a further teaching of the invention, then be performed by means of ultrasound or by means of hot air in combination with the pressing procedure already described.

In the method according to the invention either the unfolding of the expansion elements can occur magnetically and the folding occur by means of spring force or, alternatively, the unfolding of the expansion elements can occur by means of spring force and the folding occur magnetically. A third possibility, in accordance with a further embodiment of the invention, consists of reversing the folding motion by reversal of the magnetic polarity. Determination of the particular drive situation is dependent on different factors such as the distribution of forces, energy utilisation, overall size, in particular in the case of smaller pack sizes.

BRIEF DESCRIPTION OF THE DRAWINGS

In the following, the invention is explained in more detail by means of only one preferred exemplary embodiment. In the drawing, the following are shown.

DETAILED DESCRIPTION OF THE INVENTION

Figure 1:
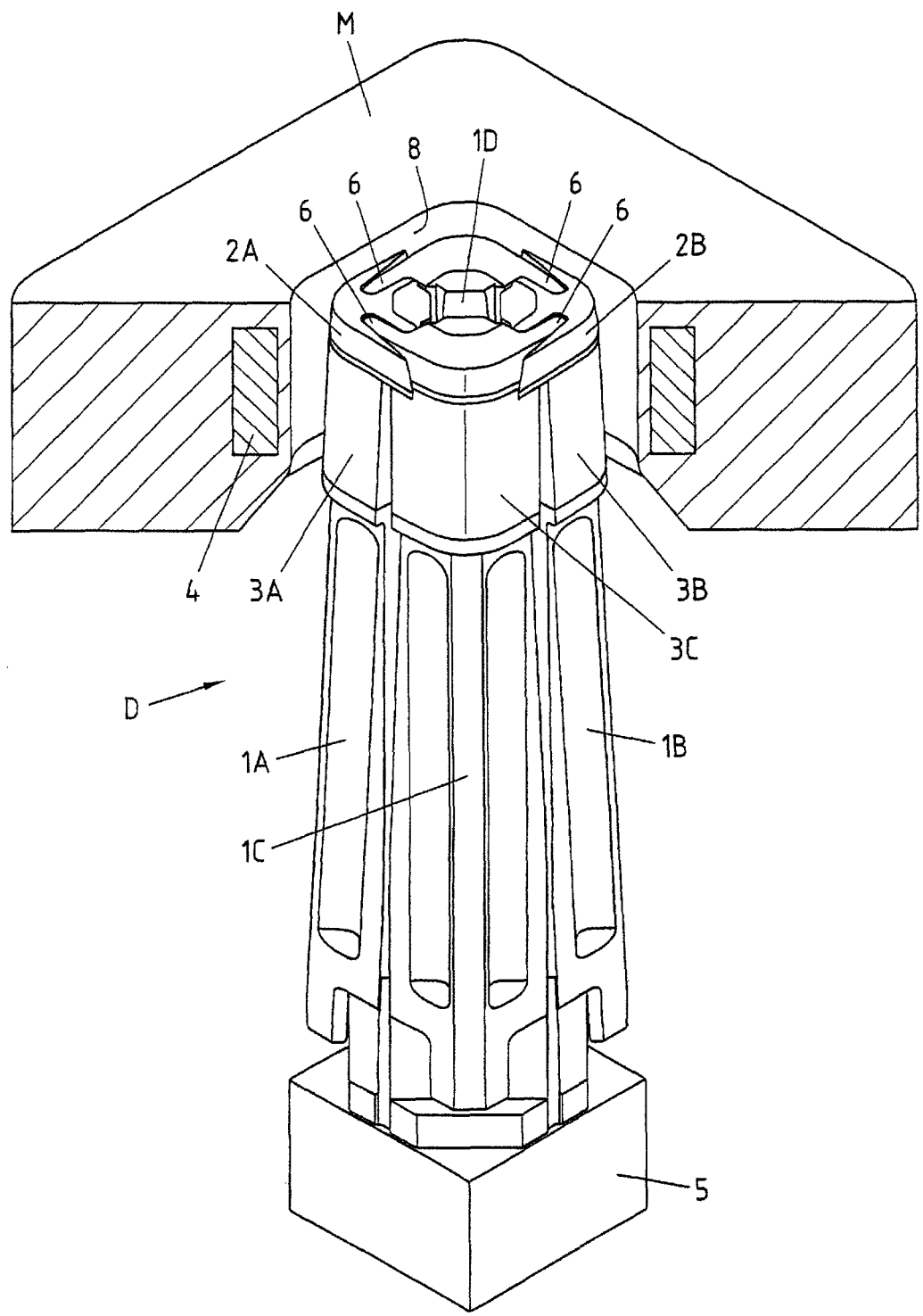
FIG. 1 a perspective view of a mandrel in a diagonally cut die of a device according to the invention with expansion elements in the rest position, FIG. 2 a perspective view of the mandrel in the die from FIG. 1 with expansion elements in the working position, FIG. 3 a plan view of the mandrel in the die with expansion elements in the rest position as per FIG. 1 and FIG. 4 a container sealed according to the invention in vertical cross section.
Figure 4:
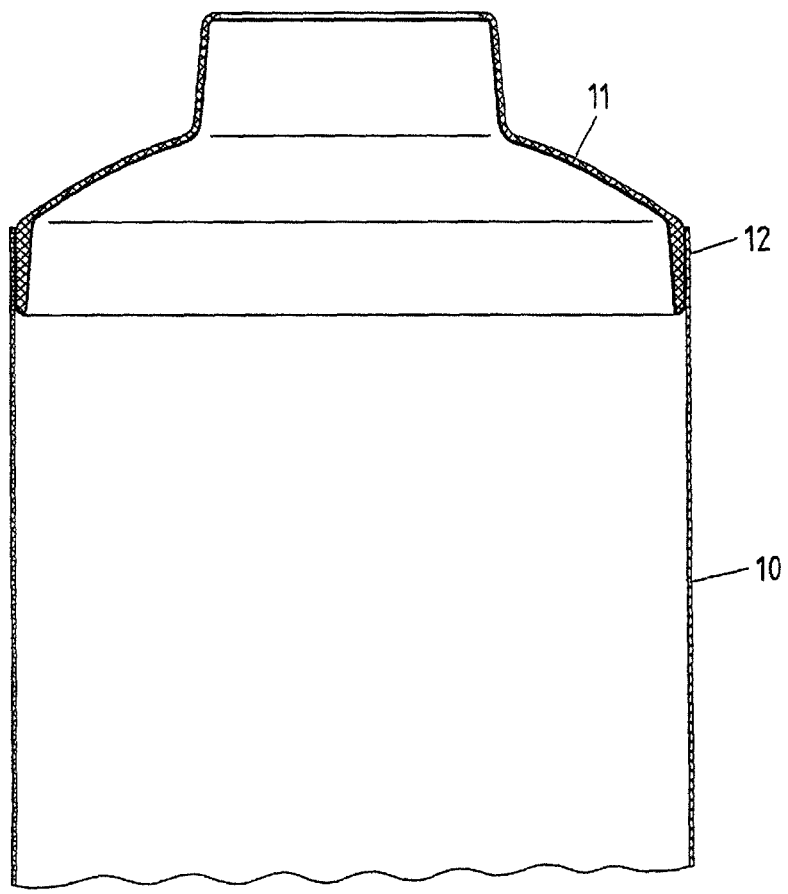

FIG. 1 shows in the first instance and essentially a mandrel D of a device according to the invention for the liquid-tight sealing of a tubular basic body 10 with a further packaging component (in FIG. 4 illustrated as a packaging head 11). The mandrel D has, in the illustrated and in this sense preferred embodiment, four expansion elements 1A, 1B, 1C and 1D which at their lower end are connected to a base element 5 in such a way as to be swivelling. The base element 5 is—in general with additional base elements—positioned firmly on a mandrel wheel (not shown).

Figure 2:
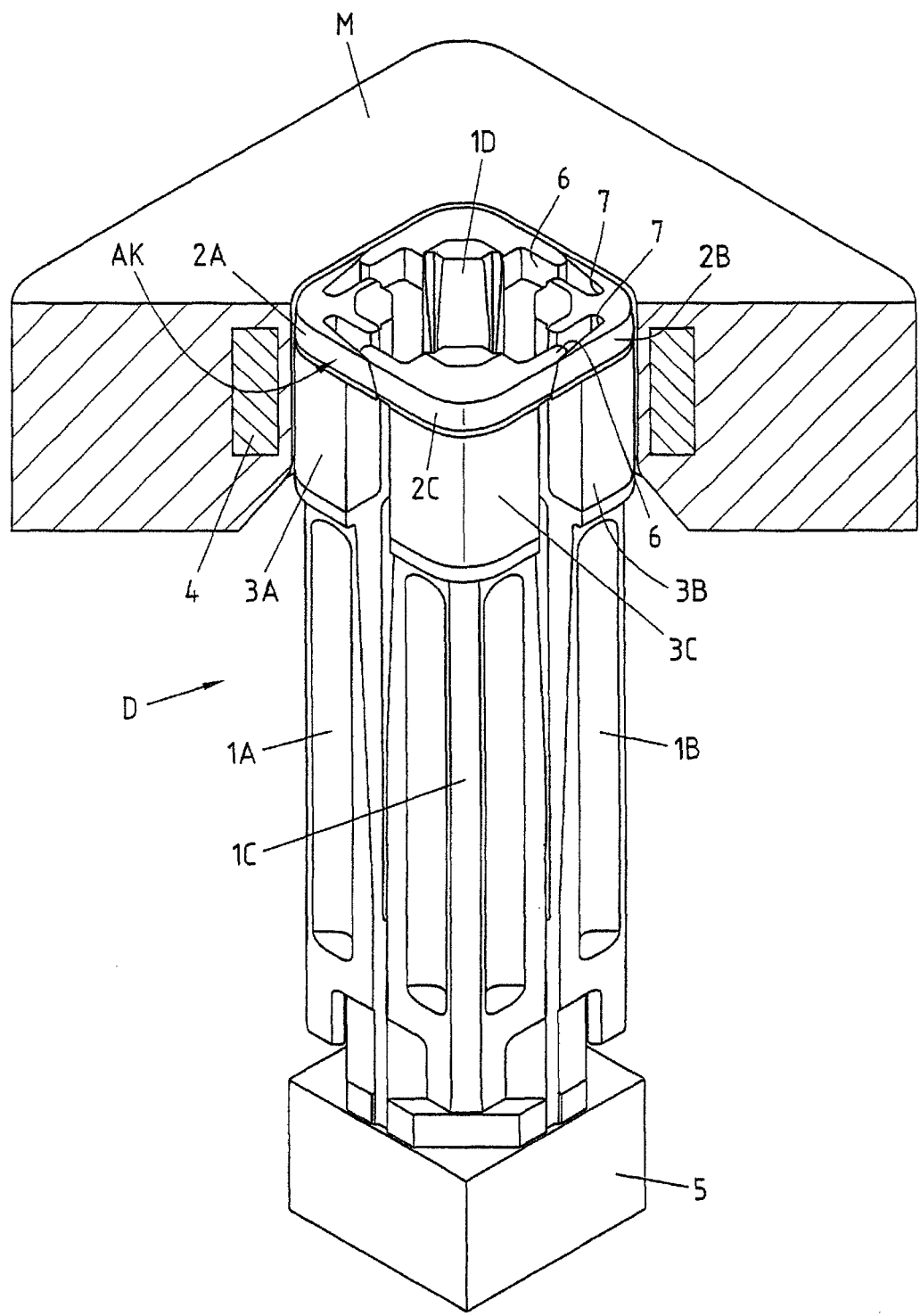

The connection of the four expansion elements 1A, 1B, 1C and 1D to the base element is preferably achieved through a guide element in each case, which allows precise swivelling in precisely specified directions. In this way, the four expansion elements 1A, 1B, 1C and 1D can move precisely in the direction of the "corners" of the opening 8 of a die M arranged around the mandrel D, in order to move from their rest position into their working position as illustrated in FIG. 2. Here, one clearly recognises that the "folded-out" expansion elements 1A, 1B, 1C and 1D form a closed, encircling outer contour AK which approximately corresponds to the inner contour IK of the opening 8 in the die M, with the effect that only a narrow annular gap remains. The die M is preferably equipped on the lower side of its opening 8 with a chamfer, not described in more detail, in order to form an entry section that tapers towards the top. The free ends of the four expansion elements 1A, 1B, 1C and 1D are formed as sealing jaws 2A, 2B, 2C and 2D. Underneath the sealing jaws 2A, 2B, 2C and 2D, magnet armatures 3A, 3B, 3C and 3D are formed.

The magnet armatures 3A, 3B, 3C and 3D may be induced to expand the mandrel D by means of the magnetic coil 4, which is preferably installed inside the die M or near to it. The total height of the magnet armatures 3A, 3B, 3C and 3D approximately corresponds to the height of the magnetic coil 4 positioned in the die M. This not only reduces the overall size of the expansion elements 1A, 1B, 1C and 1D considerably but also minimises the wear and tear and the amount of maintenance, because one can fully dispense with mechanical drive elements.

Figure 3:
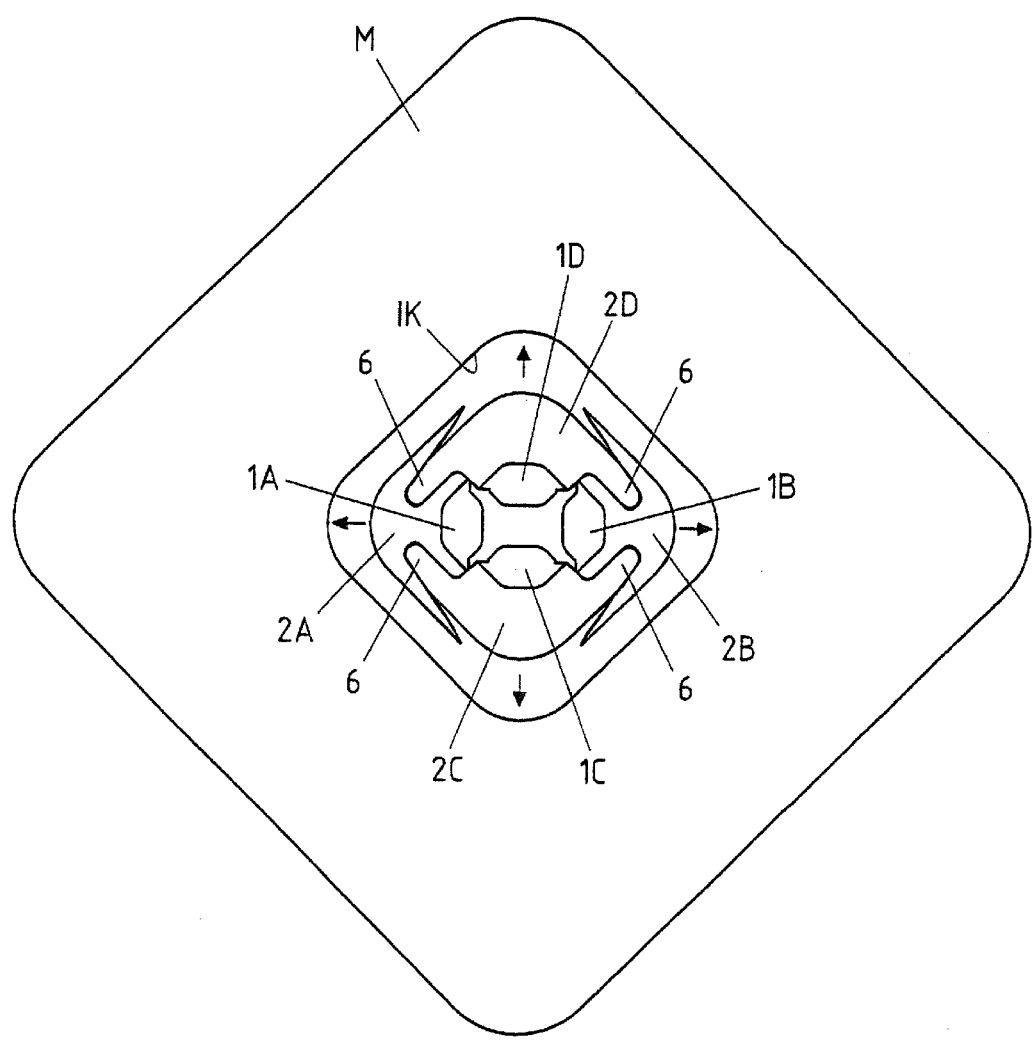

The precise interaction of the four expansion elements 1A, 1B, 1C and 1D can be best explained using FIG. 3. Here, it can be clearly recognised in a plan view of the illustration as per FIG. 1 that both the outer expansion elements 1A and 1B can be moved in the direction of the arrows from the rest position depicted to a working position, as shown in FIG. 2. The same applies to both of the inner expansion elements 1C and 1D. The direction of movement is predetermined by the direction of action of the guide elements, which may for example be designed in the form of hinges.

The opening and closing kinematics of the device according to the invention are essentially determined by the shape of the sealing jaws 2A, 2B, 2C and 2D. In order to achieve as even an unfolding and folding movement as possible, both of the inner sealing jaws 2C and 2D each have two guide tongues 6 which go into corresponding holding grooves 7 of the two outer sealing jaws 2A and 2B and, because of their "toothing" shaped at an angle, slide along one another cleanly. In this way, the amount of energy required during expansion of the mandrel D can be minimised. Through the oblique edges of the sliding surfaces, there also results, as can be clearly seen from FIG. 2, a closed, encircling outer contour AK to the sealing area of the sealing jaws 2A, 2B, 2C and 2D.

Finally FIG. 4 shows, in vertical cross section, a container manufactured according to the invention in which a tubular basic body 10 surrounds a further packaging component 11 in an overlapping area 12. It can be clearly recognised that in order to join together packaging components 10, 11 a pressing force must be applied from inside in the area of the overlapping packaging components, which can be achieved safely and elegantly by means of the device according to the invention.

With the arrangement illustrated, a pack may be manufactured as known, for example, from DE 10 2010 014 993 A1, that is described in more detail above. Its cross section is approximately square, wherein the "corners" have correspondingly large radii.

The invention claimed is:

1. A device for liquid-tight sealing of two partially overlapping packaging components, wherein one of the packaging components is a tubular basic body, formed from a blank made of cardboard and plastic composite material, and wherein a second packaging component forms a packaging head or bottom, the device comprising:
a mandrel and a die, wherein the mandrel has at least two expansion elements, wherein the at least two expansion elements in a working position have an expanded cross section, and wherein the at least two expansion elements are movable towards each other from the working position to a rest position having a reduced cross section, in order to allow the tubular basic body to be slid on the mandrel,
wherein the at least two expansion elements have sealing jaws which, when the at least two expansion elements are in the working position, form a closed, encircling outer contour, which corresponds to an inner contour formed by an opening in the die, and wherein between the inner contour and outer contour, a narrow annular gap remains for application of a pressing force from an inside onto an overlapping area of the two partially overlapping packaging components,
wherein the at least two expansion elements are each individually arranged on a joint base element to be individually swiveling,
wherein the at least two expansion elements are, at least in an area of the sealing jaws, formed as magnet armatures, and
wherein the die has one or more magnetic coils that are adapted to activate the magnet armatures to radially expand the at least two expansion elements.

2. The device according to claim 1, wherein the joint base elements are attached to a mandrel wheel.

3. The device according to claim 2, wherein the joint base elements are formed from the mandrel wheel itself.

4. The device according to claim 1, wherein each of the at least two expansion elements is attached to a guide element which allows precise swiveling in a specified direction.

5. The device according to claim 1, wherein the die is formed as an integral part in an area of a perimeter of the opening.

6. The device according to claim 1, further comprising elements for inputting heat for joining the two partially overlapping packaging components.

7. The device according to claim 6, wherein the elements for inputting heat comprise at least one ultrasound sonotrode provided in the die, and an anvil formed by the sealing jaws.

8. The device according to claim 6, wherein the elements for inputting heat comprise hot air openings within the die and/or within the sealing jaws.

9. A method for liquid-tight sealing of two partially overlapping packaging components, wherein one of the packaging components is a tubular basic body, formed from a blank made of cardboard and plastic composite material, and wherein a second packaging component forms a packaging head or bottom, comprising the following steps:
providing the device according to claim 1,
conveying an unfolded, tubular basic body, towards the mandrel,
sliding the conveyed, unfolded, tubular basic body onto the mandrel that has the at least two expansion elements that are, at least in the area of the respective sealing jaws, formed as magnet armatures, supplying the die that has the opening and the one or more magnetic coils, conveying the second packaging component onto the mandrel, partially overlapping the basic body and the second packaging component on the mandrel, positioning the opening of the die relative to the mandrel, activating the one or more magnetic coils in the die to activate the magnet armatures in the at least two expansion elements, in order to expand the at least two expansion elements to the working position, applying the pressing force from inside of the basic body and the second packaging component against the die through the expansion of the at least two expansion elements to form the encircling, outer contour in the area of the sealing jaws, inputting heat for joining the basic body and the second packaging component in an overlapping area, joining the basic body and the second packaging component, moving the at least two expansion elements into the rest position of the mandrel using a swiveling movement, removing the die from relative to the mandrel, and sliding the joined basic body and the second packaging component from the mandrel in the rest position.

10. The method according to claim 9, wherein the conveying the second packaging component takes place simultaneously with the supplying of the die that has the opening, and the die opening holding the second packaging component.

11. The method according to claim 9, wherein the expansion of the at least two expansion elements and the moving of the at least two expansion elements to the rest position takes place in precisely specified directions.

12. The method according to claim 9, wherein the inputting heat for joining takes place by use of an ultrasound sonotrode and anvil.

13. The method according to claim 9, wherein the inputting heat for joining takes place by use of hot air.

14. The method according to claim 9, wherein the expansion of the at least two expansion elements occurs magnetically and the moving of the at least two expansion elements to the rest position occurs by use of spring force.

15. The method according to claim 9, wherein moving of the at least two expansion elements to the rest position takes place by reversing the magnetic polarity of the one or more magnetic coils.

* * * * *